US011704155B2

(12) United States Patent
Vega et al.

(10) Patent No.: US 11,704,155 B2
(45) Date of Patent: Jul. 18, 2023

(54) HETEROGENEOUS SYSTEM ON A CHIP SCHEDULER

(71) Applicant: International Business Machines Corporation, Armonk, NY (US)

(72) Inventors: Augusto Vega, Mount Vernon, NY (US); Alper Buyuktosunoglu, White Plains, NY (US); Hubertus Franke, Cortlandt Manor, NY (US); John-David Wellman, Hopewell Junction, NY (US); Pradip Bose, Yorktown Heights, NY (US); Robert Matthew Senger, Tarrytown, NY (US); Aporva Amarnath, Ann Arbor, MI (US)

(73) Assignee: International Business Machine Corporation, Armonk, NY (US)

( * ) Notice: Subject to any disclaimer, the term of this patent is extended or adjusted under 35 U.S.C. 154(b) by 522 days.

(21) Appl. No.: 16/917,975

(22) Filed: Jul. 1, 2020

(65) Prior Publication Data
US 2022/0004433 A1    Jan. 6, 2022

(51) Int. Cl.
*G06F 9/48* (2006.01)
*G06Q 20/14* (2012.01)
*G06F 16/901* (2019.01)

(52) U.S. Cl.
CPC ........ *G06F 9/4893* (2013.01); *G06F 16/9024* (2019.01); *G06Q 20/145* (2013.01); *G06F 2209/486* (2013.01)

(58) Field of Classification Search
CPC ............... H04L 47/245; H04L 47/6245; H04L 12/2832; H04L 12/2809; G06F 9/505;
(Continued)

(56) References Cited

U.S. PATENT DOCUMENTS 5,437,032 A     7/1995  Wolf et al.
6,086,628 A *   7/2000  Dave ...................... G06F 30/30
                                                          716/108
(Continued)

OTHER PUBLICATIONS

Topcuoglu et al., "Performance-effective and low-complexity task scheduling for heterogeneous computing", IEEE Transactions on Parallel and Distributed Systems, vol. 13, Issue: 3, Mar. 2002, pp. 260-274.
(Continued)

*Primary Examiner* — Olusegun Goyea
(74) *Attorney, Agent, or Firm* — Stosch Sabo

(57) ABSTRACT

Described are techniques for scheduling tasks on a heterogeneous system on a chip (SoC). The techniques including receiving a directed acyclic graph at a meta pre-processor associated with a heterogeneous SoC and communicatively coupled to a scheduler, wherein the directed acyclic graph corresponds to a control flow graph of tasks associated with an application executed by the heterogeneous SoC. The techniques further including determining a rank for a respective task in the directed acyclic graph, wherein the rank is based on a priority of the respective task and a slack in the directed acyclic graph. The techniques further including providing the respective task to the scheduler for execution on the heterogeneous SoC according to the rank.

20 Claims, 11 Drawing Sheets

(58) Field of Classification Search
CPC ...... G06F 9/5083; G06F 9/5044; G06F 30/30; G06F 9/4887; G06F 8/10
USPC .............. 716/105; 703/23, 27; 718/102, 105
See application file for complete search history.

(56) References Cited

U.S. PATENT DOCUMENTS

| | | | | |
|---|---|---|---|---|
| 6,097,886 | A * | 8/2000 | Dave | G06F 8/10 703/23 |
| 6,110,220 | A * | 8/2000 | Dave | G06F 9/4887 716/108 |
| 6,112,023 | A * | 8/2000 | Dave | G06F 9/4887 716/108 |
| 6,178,542 | B1 * | 1/2001 | Dave | G06F 9/4887 716/105 |
| 6,230,303 | B1 * | 5/2001 | Dave | G06F 9/4887 716/133 |
| 6,289,488 | B1 * | 9/2001 | Dave | G06F 30/30 716/105 |
| 6,415,384 | B1 * | 7/2002 | Dave | G06F 30/30 713/1 |
| 7,254,812 | B1 * | 8/2007 | Menezes | G06F 9/5044 713/320 |
| 7,370,326 | B2 | 5/2008 | Jones et al. | |
| 8,656,405 | B2 * | 2/2014 | Fontenot | G06F 9/5083 718/105 |
| 9,367,350 | B2 | 6/2016 | Ringseth et al. | |
| 9,612,879 | B2 | 4/2017 | Matthes et al. | |
| 9,800,465 | B2 | 10/2017 | Steinder et al. | |
| 10,437,600 | B1 | 10/2019 | Kohn et al. | |
| 2005/0240924 | A1 | 10/2005 | Jones et al. | |
| 2008/0320487 | A1 * | 12/2008 | Fontenot | G06F 9/5083 718/107 |
| 2010/0088704 | A1 | 4/2010 | Ringseth et al. | |
| 2013/0275594 | A1 * | 10/2013 | Wade | G06F 9/5083 709/226 |
| 2015/0040136 | A1 | 2/2015 | Matthes et al. | |
| 2015/0134576 | A1 * | 5/2015 | Shotton | G06F 18/2411 706/12 |
| 2016/0142338 | A1 | 5/2016 | Steinder et al. | |
| 2018/0276040 | A1 | 9/2018 | Hosmani et al. | |
| 2019/0007333 | A1 * | 1/2019 | Monier | H04L 47/6275 |
| 2019/0158309 | A1 * | 5/2019 | Park | H04L 12/2832 |
| 2022/0004433 | A1 * | 1/2022 | Vega | G06F 16/9024 |

OTHER PUBLICATIONS

Tong et al., "QL-HEFT: a novel machine learning scheduling scheme base on cloud computing environment", Advances in Parallel and Distributed Computing for Neural Computing, Published online: Mar. 7, 2019, 18 pages.

Zhao et al., "Scheduling multiple DAGs onto heterogeneous systems", Proceedings 20th IEEE International Parallel & Distributed Processing Symposium, Apr. 25-29, 2006 ,14 pages.

Mao et al., "Learning scheduling algorithms for data processing clusters", SIGCOMM '19, Aug. 19-23, 2019, 19 pages.

Xu et al., "Hybrid scheduling deadline-constrained multi-DAGs based on reverse HEFT", 2016 International Conference on Information System and Artificial Intelligence, Jun. 24-26, 2016, pp. 196-202.

Chronaki et al., "Task Scheduling Techniques for Asymmetric Multi-core Systems," IEEE Transactions on Parallel and Distributed Systems, vol. 28, Issue: 7, Jul. 1, 2017, pp. 2074-2087.

Jiang et al., "Optimal Functional-Unit Assignment for Heterogeneous Systems Under Timing Constraint", IEEE Transactions on Parallel and Distributed Systems, vol. 28 , Issue: 9 , Sep. 1, 2017, 14 pages.

Hu et al., "Adaptive Real-Time Scheduling of Dynamic Multiple-Criticality Applications on Heterogeneous Distributed Computing Systems", 2019 IEEE 15th International Conference on Automation Science and Engineering, pp. 897-903.

Kumar et al., "Enhanced Energy Aware Scheduling in Multicore Processors", Journal of Intelligent and Fuzzy Systems, Jun. 2018, 11 pages.

Mell et al., "The NIST Definition of Cloud Computing", Recommendations of the National Institute of Standards and Technology, Sep. 2011, 7 pages.

Vega et al., "Heterogeneous System on a Chip Scheduler With Learning Agent", U.S. Appl. No. 16/917,981, filed Jul. 1, 2020.

IBM, List of IBM Patents or Patent Applications Treated as Related, Jun. 22, 2020, 2 pages.

* cited by examiner

HETEROGENEOUS SYSTEM ON A CHIP SCHEDULER

STATEMENT REGARDING FEDERALLY SPONSORED RESEARCH OR DEVELOPMENT

This invention was made with Government support under HR-0011-18-C-0122 awarded by the Defense Advanced Research Projects Agency (DARPA). The Government has certain rights to this invention.

BACKGROUND

The present disclosure relates to task scheduling, and, more specifically, to multi-application, multi-step scheduling on heterogeneous systems on a chip (SoC).

Systems on a chip can refer to an integrated circuit that can include many components of a computer or another electronic system. Systems on a chip can include processing elements, memory, external interfaces, digital signal processors (DSPs), bus-based communication mechanisms, and/or other components.

SUMMARY

Aspects of the present disclosure are directed toward a computer-implemented method comprising receiving a directed acyclic graph at a meta pre-processor associated with a heterogeneous system on a chip (SoC) and communicatively coupled to a scheduler, where the directed acyclic graph corresponds to a control flow graph of tasks associated with an application executed by the heterogeneous SoC. The method further comprises determining a rank for a respective task in the directed acyclic graph, where the rank is based on a priority of the respective task and a slack in the directed acyclic graph. The method further comprises providing the respective task to the scheduler for execution on the heterogeneous SoC according to the rank.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

Figure 1:
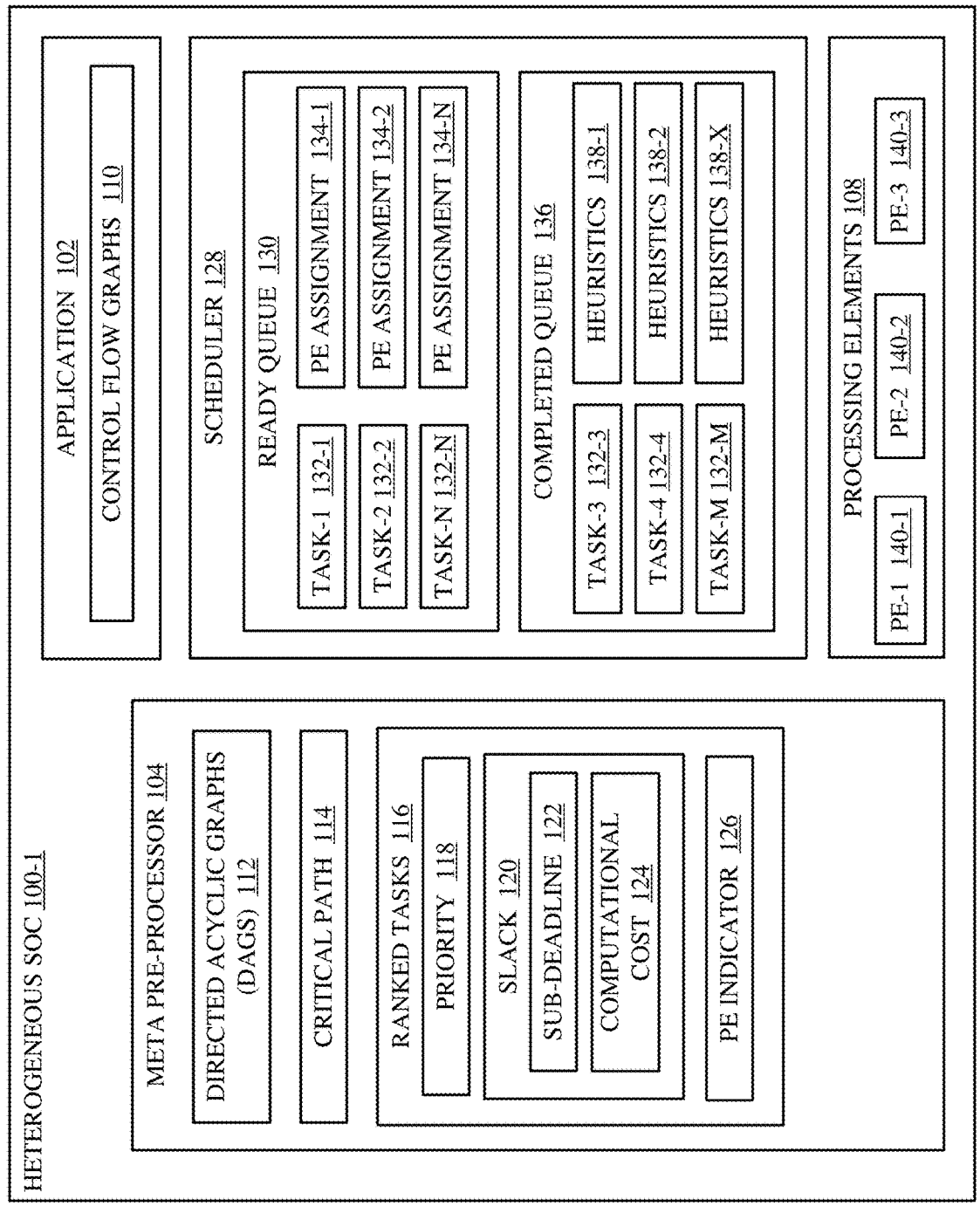
FIG. 1 illustrates a block diagram of an example heterogeneous system on a chip (SoC), in accordance with some embodiments of the present disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward task scheduling, and, more specifically, to multi-application, multi-step scheduling on heterogeneous systems on a chip (SoC). While not limited to such applications, embodiments of the present disclosure may be better understood in light of the aforementioned context.

A heterogeneous SoC is a specialized computing system that includes a variety of processing elements (PEs). The processing elements can include a combination of general-purpose processors (e.g., CPUs), special-purpose processors such as graphics processing units (GPUs), hardware accelerators, memory, and input/output (I/O) devices. SoCs can be specifically designed for particular applications (e.g., mobile applications, autonomous driving applications, etc.), thereby leading to improved performance of those particular applications. Some of these applications exhibit a high degree of heterogeneity. For example, in the domain of autonomous or semi-autonomous driving, applications can include radar detection, image processing, obstacle avoidance, communication, swarm intelligence, driving control decisions, and/or other applications. Furthermore, in the field of autonomous or semi-autonomous driving, there are a variety of real-time constraints such that each application can be associated with a priority and/or a deadline. Further still, the environment in which an autonomous or semi-autonomous vehicle operates is variable. Accordingly, the rate at which the applications are required to execute tasks can also be variable. For example, driving in a city may cause a relatively high amount of tasks to be performed by the heterogeneous SoC (e.g., monitoring tens of pedestrians and tens of surrounding vehicles) compared to driving on a rural road that may require a relatively fewer number of tasks to be performed by the heterogeneous SoC (e.g., monitoring no pedestrians and a single surrounding vehicle).

In light of the challenges imposed on heterogeneous SoCs including the variety of different types of tasks they complete, the real-time constraints associated with those tasks, the limited amount of power and resources available to the SoC, and the variability in task volume, there is a need for efficient scheduling of application tasks on heterogeneous SoCs. Aspects of the present disclosure are directed to efficient scheduling of application tasks on heterogeneous SoCs through the use of a meta pre-processor that is communicatively coupled to a scheduler of the heterogeneous SoC.

FIG. 1 illustrates a heterogeneous SoC 100-1, in accordance with some embodiments of the present disclosure. Heterogeneous SoC 100-1 can include an application 102, a meta pre-processor 104, a scheduler 128, and processing elements 108.

The application 102 can be any one of a number of domain-specific applications. For example application 102 can be an application related to autonomous or semi-autonomous driving, mobile computing, Internet of Things (IoT) intelligence, robotics, automation, machine vision, natural language processing, and/or any other application that may benefit from improved scheduling on the heterogeneous SoC 100-1. The application 102 can include control flow graphs 110. Control flow graphs 110 can represent the execution of the application 102 on the heterogeneous SoC 100-1 as a number of tasks, where each task can represent a unit of work that can be scheduled to, and executed by, one of the processing elements 108. Although a single application 102 and a single control flow graph 110 are shown in FIG. 1, there can be numerous applications 102 each with numerous control flow graphs 110.

The meta pre-processor 104 can receive the control flow graphs 110 from the application 102 and convert them to directed acyclic graphs (DAGs) 112. Each DAG 112 can include a plurality of nodes interconnected by one or more edges such that no node can loop back upon itself. The nodes can represent tasks while the edges can represent dependencies between tasks. Tasks and/or DAGs 112 can have associated metrics that must be satisfied to successfully execute such as priorities, execution deadlines, power consumption budgets, and the like.

For each of the DAGs 112, the meta pre-processor 104 can identify a critical path 114. The critical path 114 can be the path that controls the total execution time for the corresponding DAG 112. Thus, in some embodiments, the critical path 114 can be a longest executing path in the DAG 112.

The meta pre-processor 104 can determine a sequence of ranked tasks 116 for each of the tasks in the DAG 112. Each rank in the ranked tasks 116 can be based on a priority 118 of the task and a slack 120 of the DAG 112. In some embodiments, a rank of the ranked tasks 116 is equal to the priority 118 divided by the slack 120.

The priority 118 of the task can be a binary priority (e.g., critical or non-critical) or a variable priority (e.g., a number on scale of 1 to 5 where 1 is relatively low priority and 5 is relatively high priority). The priority 118 can be configured by, for example, the application 102.

The slack 120 can represent the availability of processing resources for successfully executing one or more tasks. In some embodiments, the slack 120 can be based on a sub-deadline 122 and a computational cost 124. In some embodiments, the slack 120 is equal to the computational cost 124 subtracted from the sub-deadline 122. The sub-deadline 122 can be the amount of time required to execute the given task. In some embodiments, the sub-deadline 122 can be the amount of time required to execute the given task using a general-purpose processor (e.g., CPU). In some embodiments, the sub-deadline 122 can be the amount of time required to execute the given task on one of the processing elements 108 that requires the most time to execute the task (e.g., the slowest processing element 108 for executing the task). In some embodiments, determining the sub-deadline 122 involves retrieving, from a kernel execution time table (discussed hereinafter with respect to FIG. 3), an amount of time required to perform the task using a designated processing element 108 (e.g., a CPU).

The computational cost 124 can be, for example, an average computational cost based on historical data, a worst-case computational cost, or a different computational cost. When using a worst-case computational cost, the worst-case computational cost can be based on historical data (e.g., a highest historical computational cost), pre-characterized information or pre-defined information (e.g., a predefined worst-case computational cost), or theoretical information (e.g., a theoretical worst-case computational cost considering the task and the processing elements 108).

In some embodiments, the tasks in ranked tasks 116 are respectively associated with a PE indicator 126. The PE indicator 126 can be a recommended processing element 108 for executing the associated task. The PE indicator 126 can be based on, for example, the rank, the priority 118, the slack 120, the sub-deadline 122, real-time constraints associated with the DAG 112, power constraints associated with the heterogeneous SoC 100-1, dependencies associated with the DAG 112 and/or the critical path 114, availability of various processing elements 108 (e.g., PE assignments 134 in the ready queue 130), performance characteristics of various processing elements 108 (e.g., processing speed, power consumption, etc.), heuristics 138 received from a completed queue 136, and/or other data.

The meta pre-processor 104 can provide one or more of the ranked tasks 116 to the scheduler 128 in order to schedule the tasks to the processing elements 108. In some embodiments, the meta pre-processor 104 can cause the scheduler 128 to cancel tasks, pre-empt tasks, and/or restart tasks. The scheduler 128 can input the ranked tasks 116 into a ready queue 130 such as task-1 132-1, task-2 132-2, task-N 132-N, and so on for any number of tasks 132. Each of the tasks 132 can be associated with a processing element assignment 134 such as PE assignment 134-1 for task-1 132-1, PE assignment 134-2 for task-2 132-2, and PE assignment 134-N for task-N 132-N. PE assignments 134 can be determined by the scheduler 128 or assigned according to any PE indicator 126 provided by the meta pre-processor 104.

The scheduler 128 can further include a completed queue 136 storing tasks 132 that have been successfully executed by the processing elements 108. For example, the completed queue 136 can store task-3 132-3, task-4 132-4, and task-M 132-M. Each of these tasks 132 can be associated with heuristics 138 such as heuristics 138-1 associated with task-3 132-3, heuristics 138-2 associated with task-4 132-4, and heuristics 138-X associated with task-M 132-M. Heuristics 138 can include information such as, but not limited to, which processing element 108 the associated task 132 was executed by, the execution time, the power consumed during execution, and/or other information.

Heterogeneous SoC 100-1 can further include processing elements 108. Processing elements 108 can include a variety of types of processing elements. For example, PE-1 140-1 can be a general purpose processor (e.g., CPU), PE-2 140-2 can be a graphics processing unit (GPU), and PE-3 140-3 can be a hardware accelerator. These processing elements 108 can be generically referred to as PEs 140. In addition to these broader categories of processing elements, each category of processing element can include various different models and/or brands of processing elements which may having correspondingly unique performance characteristics.

Figure 2:
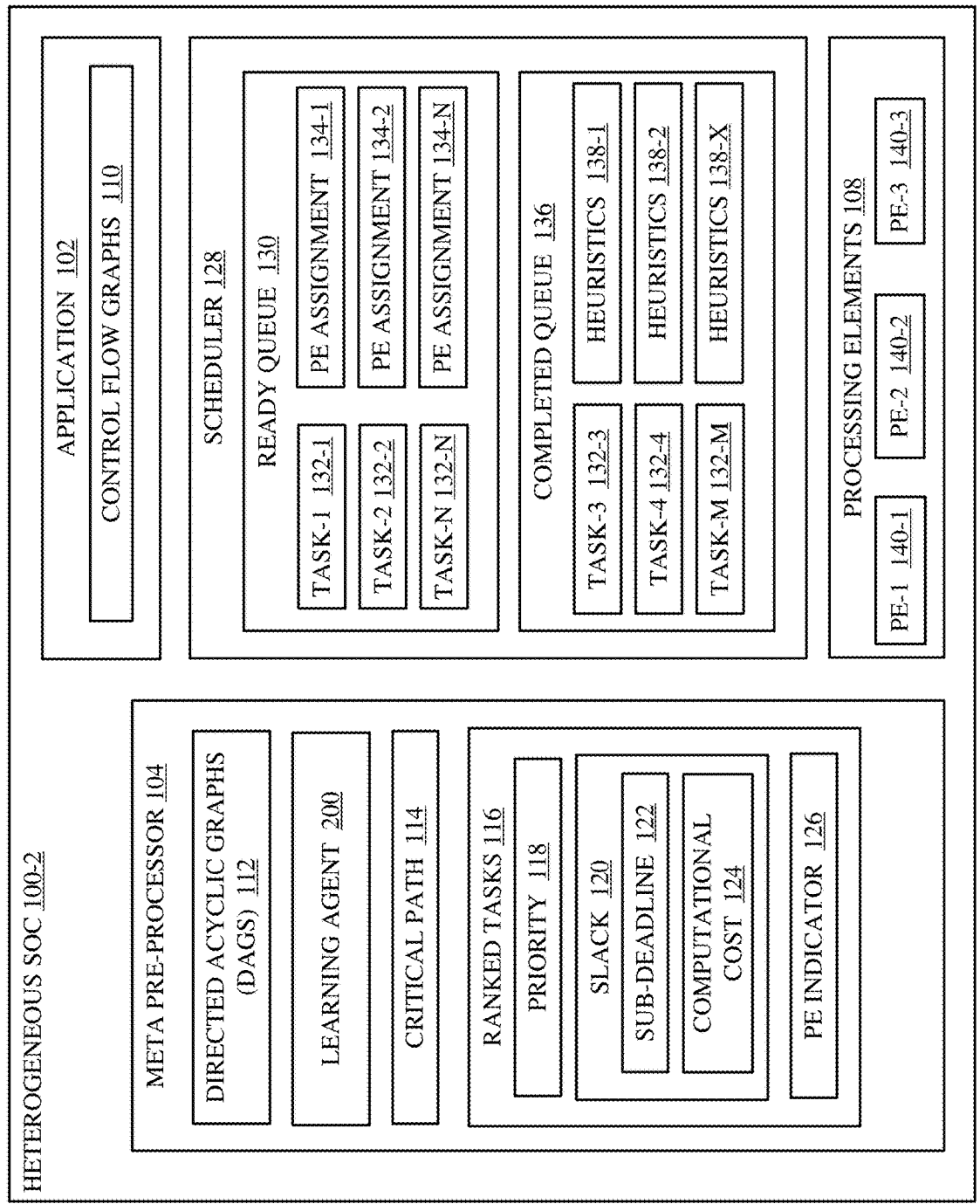
FIG. 2 illustrates a block diagram of an example heterogeneous SoC including a learning agent, in accordance with some embodiments of the present disclosure.

FIG. 2 illustrates an example heterogeneous SoC 100-2 with a learning agent 200, in accordance with some embodiments of the present disclosure. As can be seen in FIG. 2, heterogeneous SoC 100-2 is consistent with heterogeneous SoC 100-1 except for the addition of learning agent 200 in the meta pre-processor 104 of the heterogeneous SoC 100-2 which is not present in heterogeneous SoC 100-1.

In some embodiments, the learning agent 200 can include any number of machine learning algorithms such as, but not limited to, natural language processing (NLP), natural language understanding (NLU), decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, learning agent 200 can be configured to perform machine learning on current and/or historical DAGs 112, critical paths 114, ranked tasks 116, the ready queue 130, the completed queue 136, heuristics 138, processing elements 108, and/or other information using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multi-dimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

After training the learning agent 200, the learning agent 200 can ingest one or more of a DAG 112, a ready queue 130, completed queue 136, heuristics 138, and/or processing elements 108 and generate ranked tasks 116 and/or PE indicators 126. The ranked tasks 116 can then be provided to the scheduler 128.

Although the ranked tasks 116 shown in the heterogeneous SoC 100-2 of FIG. 2 are associated with a priority 118 and a slack 120, these features need not necessarily be explicitly input to, or output from, the learning agent 200. Said another way, the machine learning algorithms employed by the learning agent 200 may mask the priority 118 and/or the slack 120 in various inputs, layers, and/or outputs of the learning agent 200 such that any output of the learning agent 200 is based, at least in part, on the priority 118 and the slack 120 even if these features are internally derived, considered, and/or weighted by the learning agent 200 without ever being explicitly visible to a user.

In some embodiments, the learning agent 200 trains on a dedicated training set of historical data, whereas in other embodiments, the learning agent 200 trains on-the-fly using real-time data. Furthermore, in some embodiments, the learning agent 200 is updated or re-trained using heuristics 138 of completed tasks 132 in the completed queue 136.

Heterogeneous SoC 100-1 and heterogeneous SoC 100-2 can generically be referred to as heterogeneous SoC 100 in embodiments that can utilize either of the aforementioned configurations. Heterogeneous SoC 100 can include more or fewer components than the components shown in FIGS. 1-2 according to various embodiments of the present disclosure. Furthermore, the configuration of the components can be different than the configurations shown in FIGS. 1-2. For example, in some embodiments, the meta pre-processor 104 is software downloaded to a preexisting heterogeneous SoC 100, where the downloaded software can be executed on the heterogeneous SoC 100 to interact with the scheduler 128. In these embodiments, the functionality provided by the meta pre-processor 104 can advantageously retrofit preexisting heterogeneous SoCs. In other embodiments, the meta pre-processor 104 is incorporated into a preexisting scheduler 128 using specialized hardware or the meta pre-processor 104 and scheduler 128 are integrated together in a new design utilizing specialized hardware. In such embodiments, the heterogeneous SoC can exhibit performance improvements such as increased speed, decreased power consumption, and the like due to efficiencies and optimizations realized by incorporating of the meta pre-processor 104 into the scheduler 128 at the hardware level.

Figure 3:
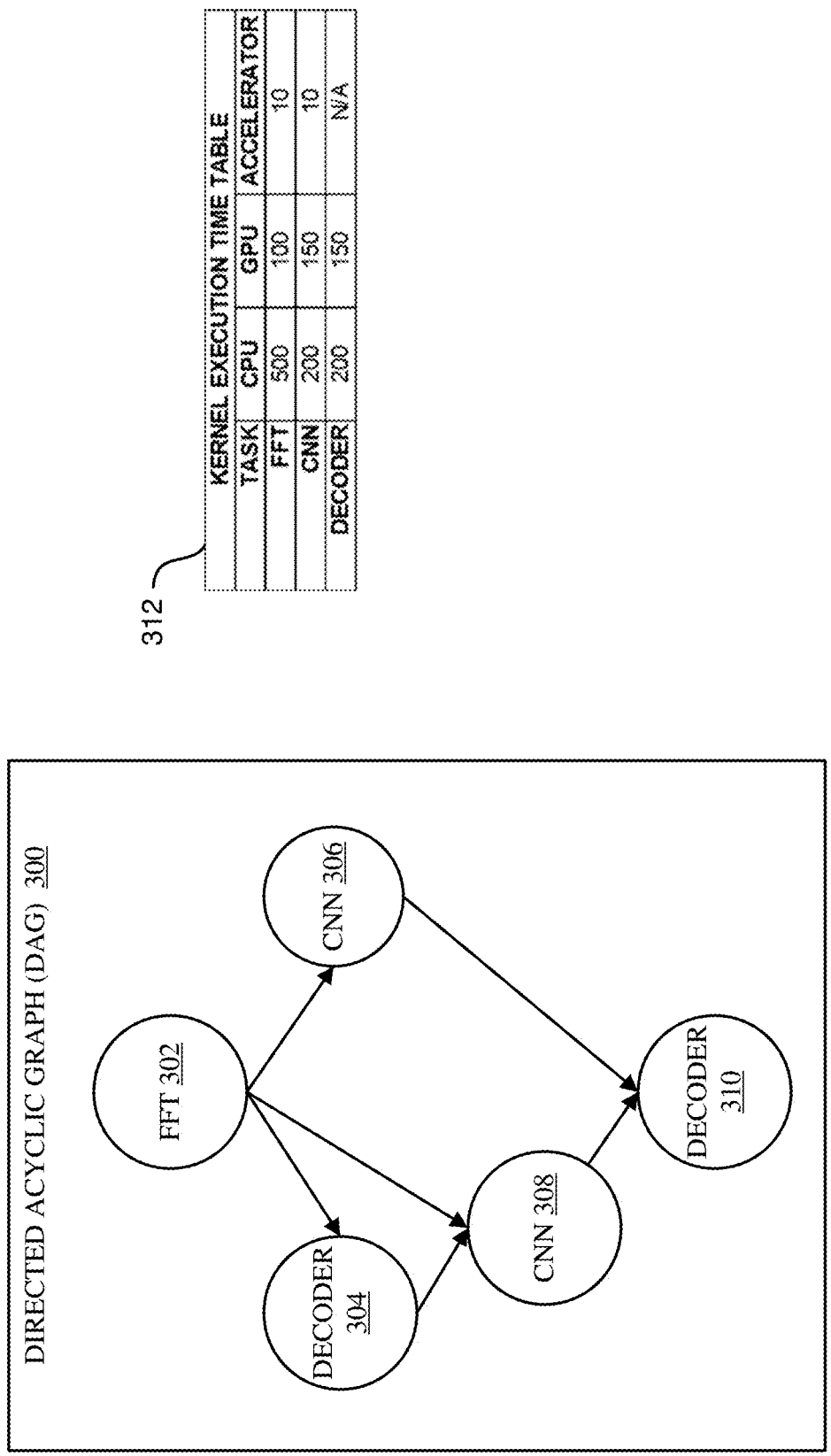
FIG. 3 illustrates a diagram of a directed acyclic graph and kernel execution time table, in accordance with some embodiments of the present disclosure.

FIG. 3 illustrates a diagram of an example DAG 300 and a kernel execution time table 312, in accordance with some embodiments of the present disclosure. DAG 300 can be an example of DAG 112 discussed with respect to FIGS. 1-2. DAG 300 includes five nodes including a Fast Fourier Transform (FFT) node 302, a decoder node 304, a convolutional neural network (CNN) node 306, a CNN node 308, and a decoder node 310. The edges connecting the nodes illustrate dependencies between the nodes. In the DAG 300 illustrated in FIG. 3, the critical path 114 includes FFT node 302, decoder node 304, CNN node 308, and decoder node 310 insofar as this is the longest execution path in the DAG 300.

In some embodiments, the critical path 114 can be associated with an execution time by querying a kernel execution time table 312. For example, the critical path 114 can have a critical path time of 1100 insofar as, according to the kernel execution time table 312, FFT node 302 executed by a CPU (e.g., a slowest processing element 108) has a time of 500, decoder node 304 executed by a CPU has a time of 200, CNN node 308 executed by a CPU has a time of 200, and decoder node 310 executed by a CPU has a time of 200.

The sum of these times in the critical path 114 is 1100. Accordingly, the critical path time is 1100. Here, the metric associated with the critical path time can be seconds, milliseconds, microseconds, cycles, and/or any other metric useful for representing an amount of time to complete a task.

Although the DAG 300 includes five nodes illustrating three types of tasks, this is for illustrative purposes only. In some embodiments, the DAG 300 can be made up of tens, hundreds, or thousands of nodes having more types of tasks than the tasks shown in FIG. 3. Such embodiments result in a kernel execution time table 312 having a corresponding increase in the number of rows to reflect each of the types of tasks. Similarly, although kernel execution time table 312 contains three types of PE 140 (e.g., CPU, GPU, and accelerator), in some embodiments, there can be tens, hundreds, or thousands of different types of PEs 140.

Figure 4:
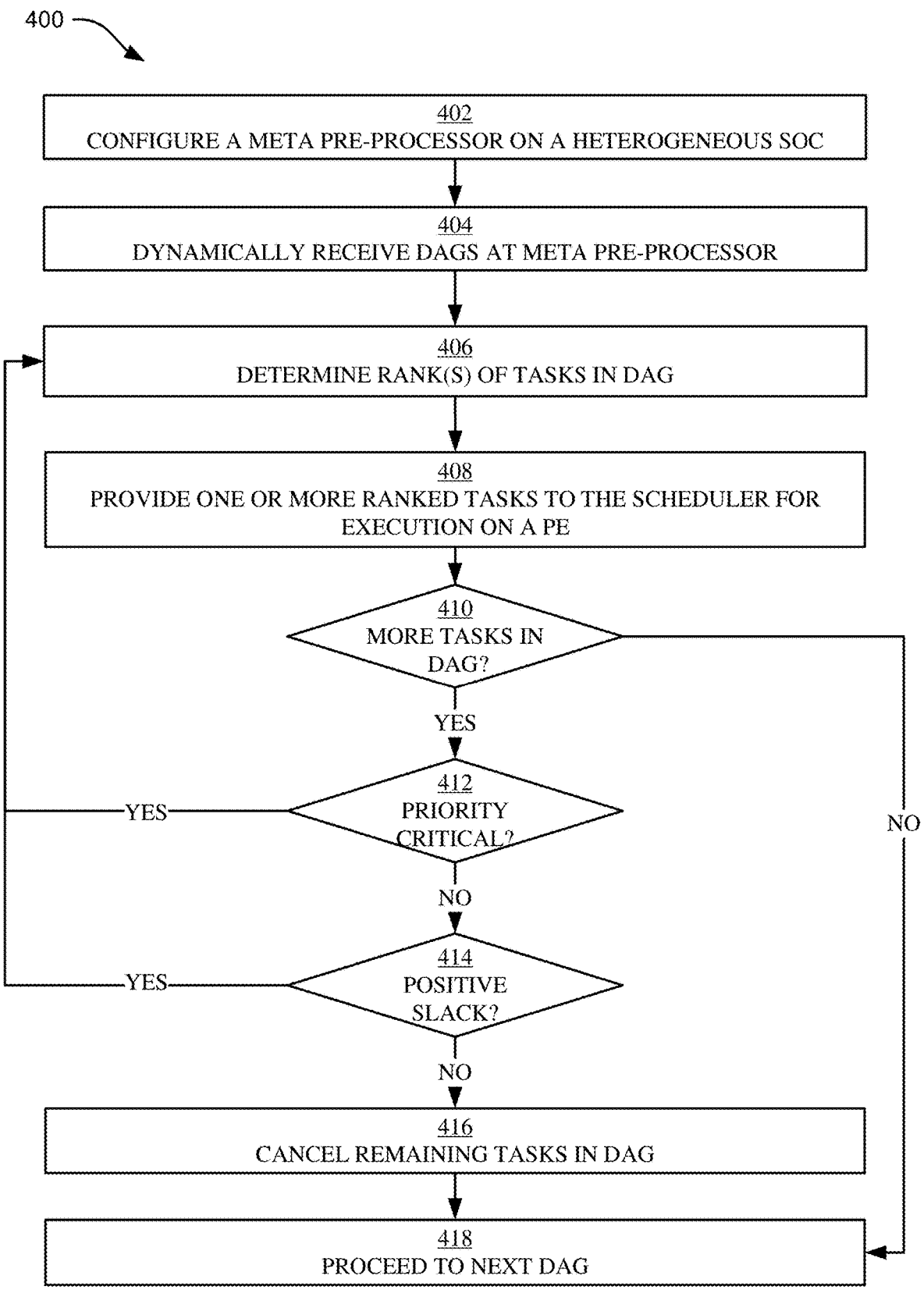
FIG. 4 illustrates a flowchart of an example method for using a meta pre-processor for scheduling tasks in a heterogeneous SoC, in accordance with some embodiments of the present disclosure.

FIG. 4 illustrates a flowchart of an example method 400 for using a meta pre-processor 104 for scheduling tasks in a heterogeneous SoC 100, in accordance with some embodiments of the present disclosure. The method 400 can be implemented by a meta pre-processor 104, a heterogeneous SoC 100, a computer, a processor, or another configuration of hardware and/or software.

Operation 402 includes configuring a meta pre-processor 104 on a heterogeneous SoC 100. In some embodiments, operation 402 includes downloading instructions for the meta pre-processor 104 to the heterogeneous SoC 100 and executing the downloaded instructions to install and implement the meta pre-processor 104 on the heterogeneous SoC 100. In some embodiments, operation 402 includes designing and fabricating a heterogeneous SoC 100 to include the meta pre-processor 104. In some embodiments, operation 402 further includes configuring rules of the meta pre-processor 104 for applications 102 implemented by the heterogeneous SoC 100. As an example, configuring rules of the meta pre-processor 104 can include, but is not limited to, defining priorities 118 for different tasks, determining computational costs 124 associated with different types of tasks implemented on different types of processing elements 108, retrieving a kernel execution time table 312 for determining a critical path time and/or sub-deadlines 122, retrieving information related to processing elements 108, and/or retrieving information related to heuristics 138. In embodiments where the heterogeneous SoC 100 is the heterogeneous SoC 100-2 including the learning agent 200, operation 402 can include downloading, configuring, and/or training the learning agent 200 as discussed in more detail hereinafter with respect to FIG. 6.

Operation 404 includes dynamically receiving one or more DAGs 112 at the meta pre-processor 104. The DAGs 112 can be received dynamically insofar as each DAG 112 can be associated with a control flow graph 110 of an application 102, and the application 102 can implement a control flow graph 110 according to execution path dependencies and/or environmental triggers. Thus, although the DAGs 112 do not necessarily change, the rate at which they arrive, the order in which they arrive, and/or the frequency with which they arrive at the meta pre-processor 104 can be dynamic.

Operation 406 includes determining ranked tasks 116 for one or more tasks in one or more received DAGs 112. In some embodiments, operation 406 includes determining ranked tasks 116 for at least one task in a critical path 114 of the DAG 112. Operation 406 can determine a rank in ranked tasks 116 by dividing a priority 118 of a task by the slack 120 in the DAG 112. The slack 120, meanwhile, can be calculated by subtracting a computational cost 124 from a sub-deadline 122. The sub-deadline 122 can be determined using a kernel execution time table 312. The slack 120 can be specific to a single node or summed for each node remaining in a critical path 114 of the DAG 112.

In some embodiments, operation 406 further includes generating a PE indicator 126 for one or more of the ranked tasks 116. The PE indicator 126 can represent a recommended processing element 108 for executing the associated task. The PE indicator 126 can be determined by a variety of factors including, for example, availabilities of processing elements 108, performance characteristics of processing elements 108 for a type of task (e.g., as retrieved from kernel execution time table 312), a critical path 114 in the DAG 112, a priority 118 of the task, a slack 120 of the DAG 112, a sub-deadline 122 of the task, a computational cost 124, tasks 132 and their associated PE assignments 134 in the ready queue 130, heuristics 138 from completed tasks 132 in the completed queue 136, and/or other information.

In some embodiments, where the heterogeneous SoC 100 is the heterogeneous SoC 100-2 including the learning agent 200, operation 406 can include inputting the DAG 112 into the learning agent 200 and receiving as output, from the learning agent 200, ranked tasks 116. In some embodiments, processing elements 108 are also input to the learning agent 200 together with the DAG 112 (and, optionally, information from the ready queue 130 and the completed queue 136), and in such embodiments, a PE indicator 126 can be received as output from the learning agent 200 for one or more of the ranked tasks 116.

Operation 408 includes providing one or more of the ranked tasks 116 to the scheduler 128 for execution by one or more of the processing elements 108 according to the rank. In some embodiments, operation 408 includes sending a highest ranked, or a set of highest ranked tasks to the scheduler 128. In some embodiments, for each task sent to the scheduler 128, a PE indicator 126 corresponding to the task is also provided to the scheduler 128. In some embodiments, upon receiving the ranked tasks 116 (and optionally the PE indicators 126) the scheduler 128 can place the ranked tasks 116 in a ready queue 130 where each task 132 is associated with a PE assignment 134, and where the PE assignment 134 can be assigned by the scheduler 128 or based on the PE indicator 126 (if a PE indicator 126 is provided).

Operation 410 includes determining if there are more tasks remaining in the DAG 112. If not (410: NO), the method 400 continues to operation 418 and proceeds to a next DAG 112. If so (410: YES), the method 400 proceeds to operation 412.

Operation 412 includes determining if one or more remaining tasks within the DAG 112, or the DAG 112 itself, is associated with a priority 118 of critical, essential, necessary, or another indicator representing a relatively high importance for completing the task or the DAG 112. If so (412: YES), the method 400 returns to operation 406 and updates the ranked tasks 116 of one or more remaining tasks in the DAG 112. Updating the ranked tasks 116 can involve receiving, from the scheduler 128, heuristics 138 associated with completed tasks 132 in the completed queue 136 and using the received information to update the ranked tasks 116. In some embodiments, updating the ranked tasks 116 includes calculating an updated slack 120 based on an updated sub-deadline 122 and/or an updated computational cost 124. In some embodiments, updating the ranked tasks 116 also includes updating the PE indicators 126.

In embodiments where the heterogeneous SoC 100 is the heterogeneous SoC 100-2 including the learning agent 200, updating the ranked tasks 116 includes inputting any received information (e.g., heuristics 138) together with remaining tasks in the DAG 112 (or critical path 114) to the learning agent 200, and receiving as output from the learning agent 200 updated ranked tasks 116. Furthermore, in some embodiments, the updated ranked tasks 116 can be associated with updated PE indicators 126.

If the priority 118 is not critical, essential, necessary, or another indicator representing a relatively high importance for completing the task or the DAG 112 (412: NO), then the method 400 can proceed to operation 414. Operation 414 includes determining if there is positive slack 120 in the DAG 112. Positive slack 120 can indicate that there is sufficient time and/or resources for completing the remaining tasks in the DAG 112, whereas negative slack 120 can indicate that there is insufficient time and/or resources for completing the remaining tasks in the DAG 112. If there is positive slack 120 for remaining tasks in the DAG 112 (414: YES), then the method 400 can return to operation 406 and determine updated ranked tasks 116 as previously discussed. If there is negative slack 120 for remaining tasks in the DAG 112 (414: NO), then the method 400 can proceed to operation 416.

Operation 416 includes canceling remaining tasks in the DAG 112. Canceling remaining tasks in the DAG 112 where the remaining tasks are non-critical (per operation 412) and where there is insufficient time and/or resources to successfully perform the remaining tasks (per operation 414) can improve efficiency by reducing resources and traffic associated with storing, scheduling, and/or executing the remaining tasks. Accordingly, operation 416 can improve performance of the heterogeneous SoC 100 without loss of functionality insofar as the canceled tasks are those in a non-critical DAG 112 that could not have been successfully completed due to the negative slack 120 of the remaining tasks in the DAG 112.

Operation 418 includes proceeding to a next DAG 112. Although the method 400 is discussed with respect to a single DAG 112, in some embodiments, the method 400 can be performed for multiple, simultaneously pending DAGs 112 where the ranked tasks 116 can include tasks drawn from the multiple, simultaneously pending DAGs 112.

Figure 5:
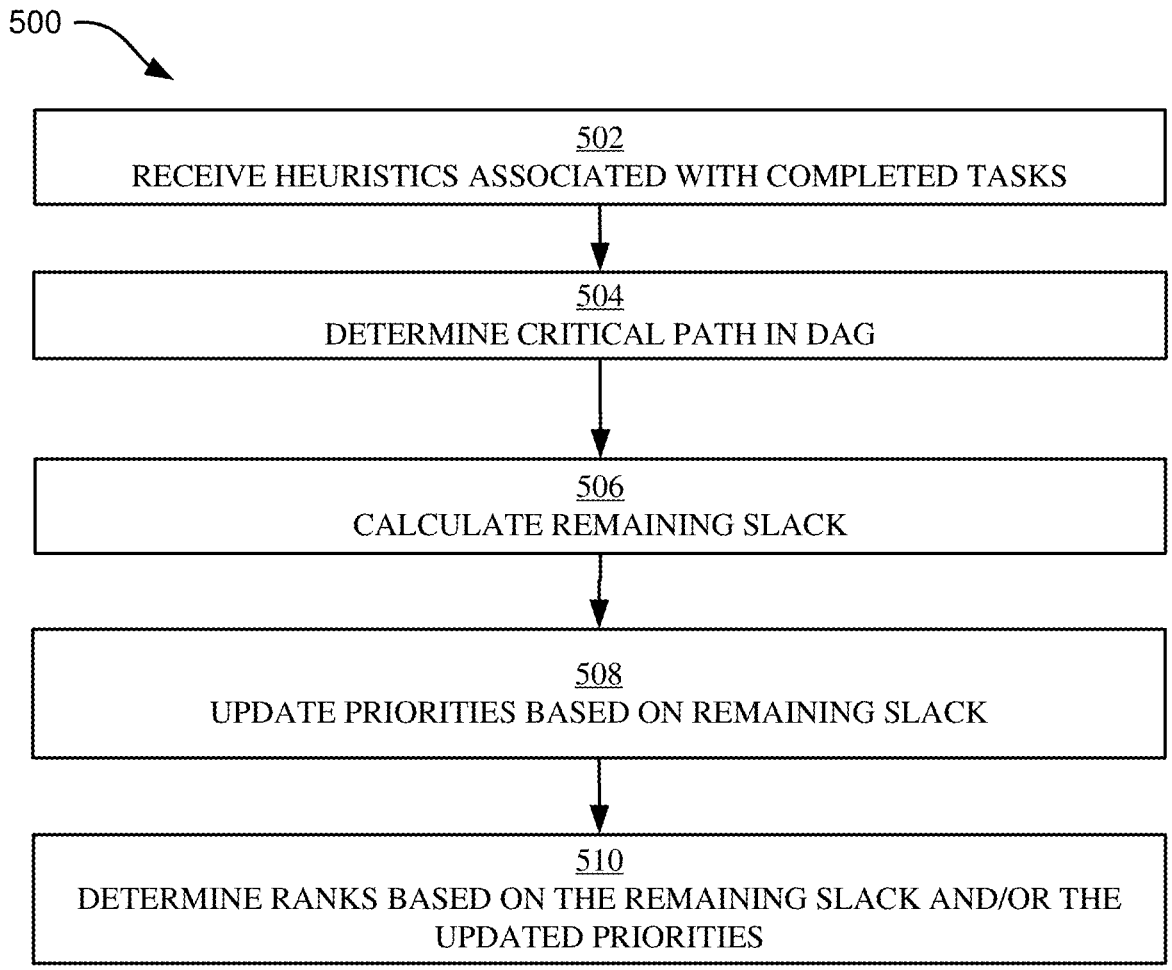
FIG. 5 illustrates a flowchart of an example method for determining ranked tasks, in accordance with some embodiments of the present disclosure.

FIG. 5 illustrates a flowchart of an example method 500 for determining the ranked tasks 116 in DAG 112, in accordance with some embodiments of the present disclosure. The method 500 can be implemented by a meta pre-processor 104, a heterogeneous SoC 100-1, a computer, a processor, or another configuration of hardware and/or software. In some embodiments, the method 500 is a sub-method of operation 406 of FIG. 4.

Operation 502 includes receiving heuristics 138 associated with completed tasks 132 in a completed queue 136. In some embodiments, the heuristics 138 are received at the meta pre-processor 104 and from the scheduler 128. The heuristics 138 can be received in batches or semi-continuously as the heuristics 138 are generated.

Operation 504 includes determining the critical path 114 of the DAG 112. In some embodiments, the critical path 114 is a longest execution path through the DAG 112 and indicates the execution sequence controlling the time to complete the entirety of the DAG 112. In some embodiments, operation 504 includes calculating a critical path time using a kernel execution time table 312 to sum the time for each task in the critical path 114.

Operation 506 includes calculating a remaining slack 120 associated with the DAG 112. Operation 506 can include calculating the slack 120 for each remaining task in the critical path 114 and summing each slack 120 to find an overall slack 120 of the DAG 112. For example, a slack 120 for a first task can be determined by subtracting a computational cost 124 from a sub-deadline 122 for the first task.

Operation 508 includes updating priorities 118 based on the remaining slack 120 of the DAG 112 and/or other considerations such as, but not limited to, completed tasks 132 in the completed queue 136, pending tasks 132 in the ready queue 130, available processing elements 108, and/or other information.

Operation 510 includes determining (or updating) the ranked tasks 116 and/or PE indicators 126 for remaining tasks in the DAG 112 based on the critical path 114, the priorities 118, the slack 120, the sub-deadline(s) 122, the computational cost(s) 124, pending tasks 132 and their PE assignments 134 in the ready queue 130, completed tasks 132 in the completed queue 136, information regarding the processing elements 108, and/or other information. In some embodiments, the rank for a task is determined by dividing the priority 118 by the slack 120.

Figure 6:
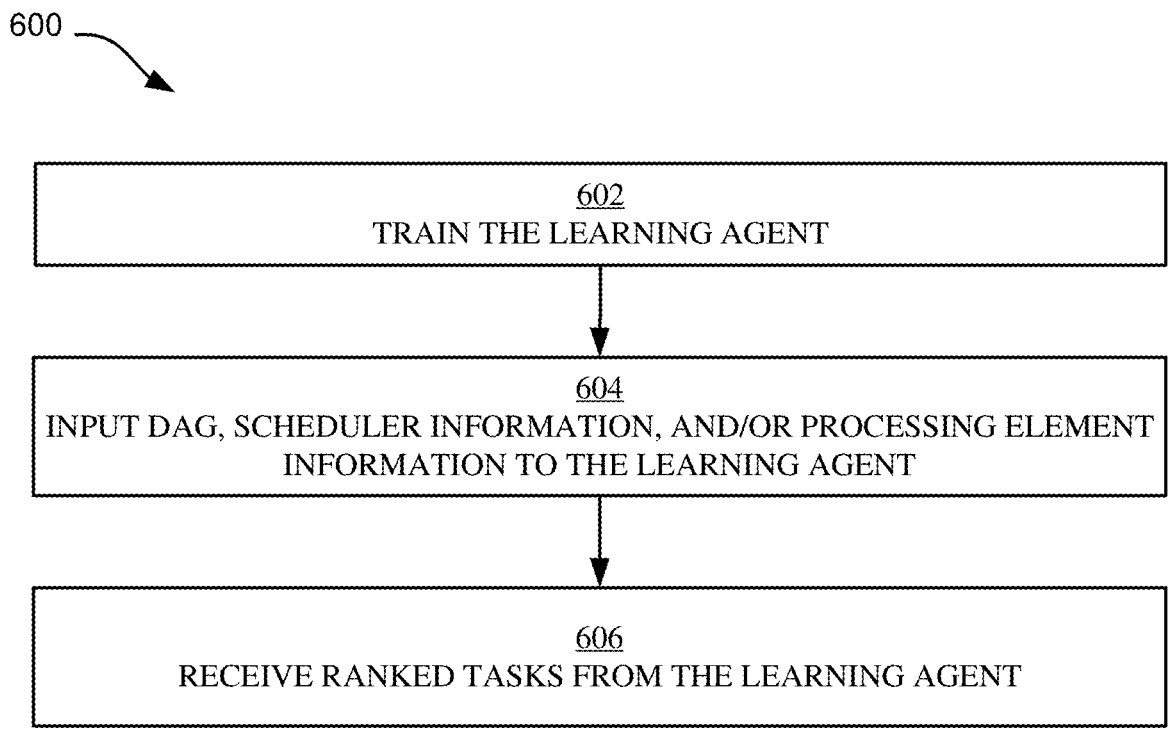
FIG. 6 illustrates a flowchart of an example method for determining ranked tasks by using a learning agent, in accordance with some embodiments of the present disclosure.

FIG. 6 illustrates a flowchart of an example method 600 for utilizing a learning agent 200 implementing machine learning algorithms in a meta pre-processor 104, in accordance with some embodiments of the present disclosure. The method 600 can be implemented by a meta pre-processor 104, a heterogeneous SoC 100-2, a computer, a processor, or another configuration of hardware and/or software. In some embodiments, the method 500 is a sub-method of operation 406 of FIG. 4.

Operation 602 includes training the learning agent 200. The learning agent 200 can be trained using supervised, semi-supervised, or unsupervised machine learning training techniques. In some embodiments, the learning agent 200 is trained on-the-fly during operation of the heterogeneous SoC 100-2. In other embodiments, the learning agent 200 is trained on a historical training set before being utilized in a heterogeneous SoC 100-2.

Operation 604 includes inputting one or more of a DAG 112, information related to the scheduler 128, and/or information related to the processing elements 108 to the learning agent 200. The DAG 112 can have associated deadlines, priorities, and/or dependencies for respective tasks in the DAG 112, or for the entirety of the DAG 112 itself. In some embodiments, operation 604 can include inputting information from the scheduler 128 to the learning agent 200 such as, but not limited to, pending tasks 132 in the ready queue 130, PE assignments 134 associated with pending tasks 132 in the ready queue 130, completed tasks 132 from the completed queue 136, heuristics 138 associated with the completed tasks 132 in the completed queue 136, and the like. In some embodiments, operation 604 can include inputting information from the processing elements 108 to the learning agent 200 such as, but not limited to, numbers, types, and availabilities of respective PEs 140 in the processing elements 108, and/or other information related to the processing elements 108.

Operation 606 includes receiving, from the learning agent 200, ranked tasks 116. In some embodiments, operation 606 further includes receiving, from the learning agent 200, PE indicators 126 associated with each of the ranked tasks 116.

Figure 7:
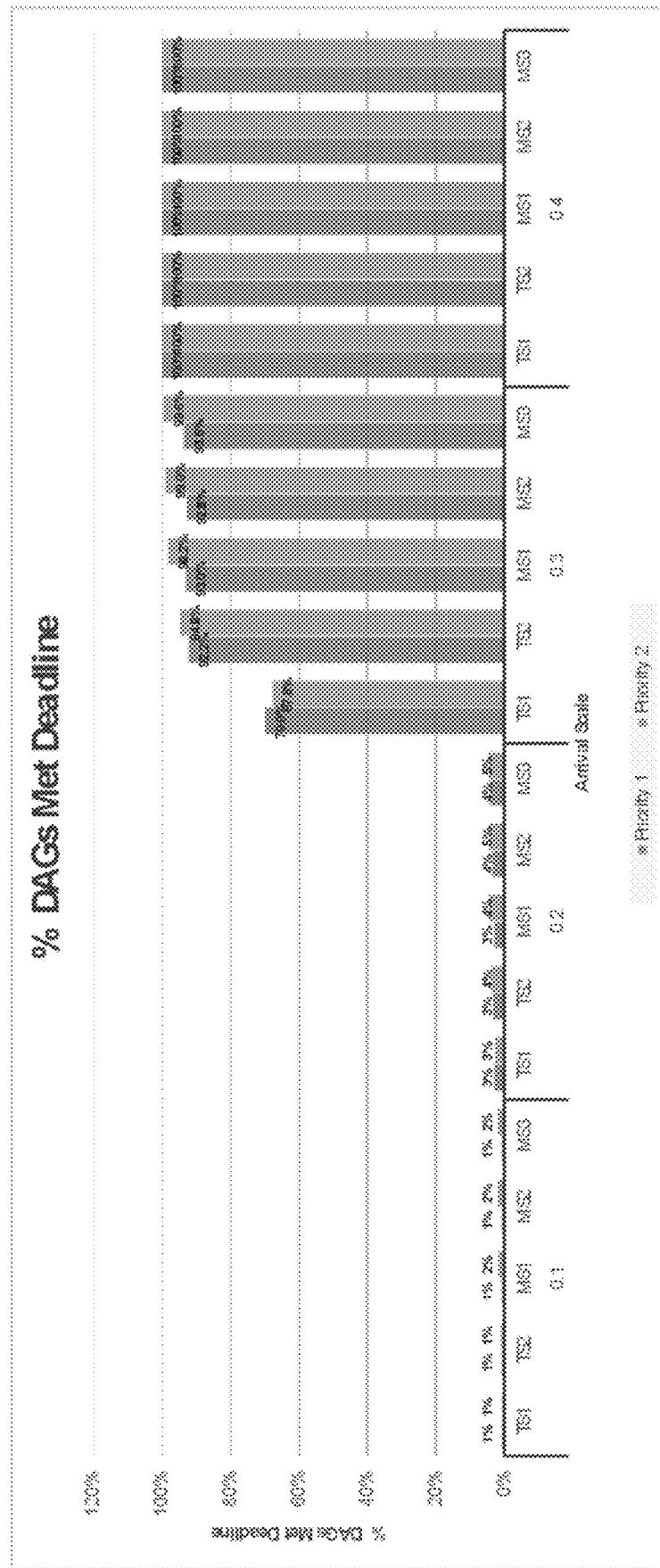
FIG. 7 illustrates a graph of experimental results showing a percentage of met deadlines, in accordance with some embodiments of the present disclosure.

FIG. 7 illustrates a graph 700 of experimental results showing a percentage of met deadlines, in accordance with some embodiments of the present disclosure. The graph 700 illustrates a variety of configurations of different aspects of the present disclosure including TS1, TS2, MS1, MS2, and MS3. TS1 represents scheduling ready tasks to processing elements in order to obtain the fastest response time in a non-blocking order. Non-blocking can refer to situations where, if unable to schedule a first task, then the task is skipped and a next task is scheduled. TS1 is included to approximate performance of a typical heterogeneous SoC. TS2 represents scheduling ready tasks to processing elements in order to obtain the fastest response time in a non-blocking order, where TS2 considers pending tasks (e.g., pending tasks 132 in ready queue 130) when determining the fastest response time. MS1 represents the configuration of TS2, where the order of tasks are based on a rank (e.g., from ranked tasks 116) which is based on a sub-deadline (e.g., sub-deadline 122), an average cost (e.g., computational cost 124), and a priority (e.g., priority 118). MS2 is similar to MS1, but where MS1 utilizes an average cost, MS2 utilizes a maximum cost (e.g., computational cost 124). MS3 is similar to MS1, except where MS1 utilizes a sub-deadline, MS3 utilizes remaining slack (e.g., slack 120), and where MS1 utilizes an average computational cost, MS3 utilizes a maximum computational cost (e.g., computational cost 124).

The y-axis of graph 700 illustrates a percentage of executed DAGs that met their associated deadlines while the x-axis differentiates between TS1, TS2, MS1, MS2, and MS3 for different priority ratings (e.g., priority 1—non-critical, and priority 2—critical) over a variety of arrival intervals. Arrival intervals can refer to a rate of arrival where a higher number corresponds to a relatively slower rate of arrival and a lower number corresponds to a relatively faster rate of arrival. As shown in the graph 700, TS2, MS1, MS2, and MS3 outperform TS1 in arrival scale 0.3. Furthermore, priority 2 tasks (e.g., critical tasks) generally outperformed priority 1 tasks (e.g., non-critical tasks) for TS2, MS1, MS2, and MS3. Accordingly, aspects of the present disclosure can improve heterogeneous SoC operation by increasing the number of DAG deadlines met in the heterogeneous SoC using a variety of techniques discussed above with respect to TS2, MS1, MS2, and/or MS3.

Figure 8:
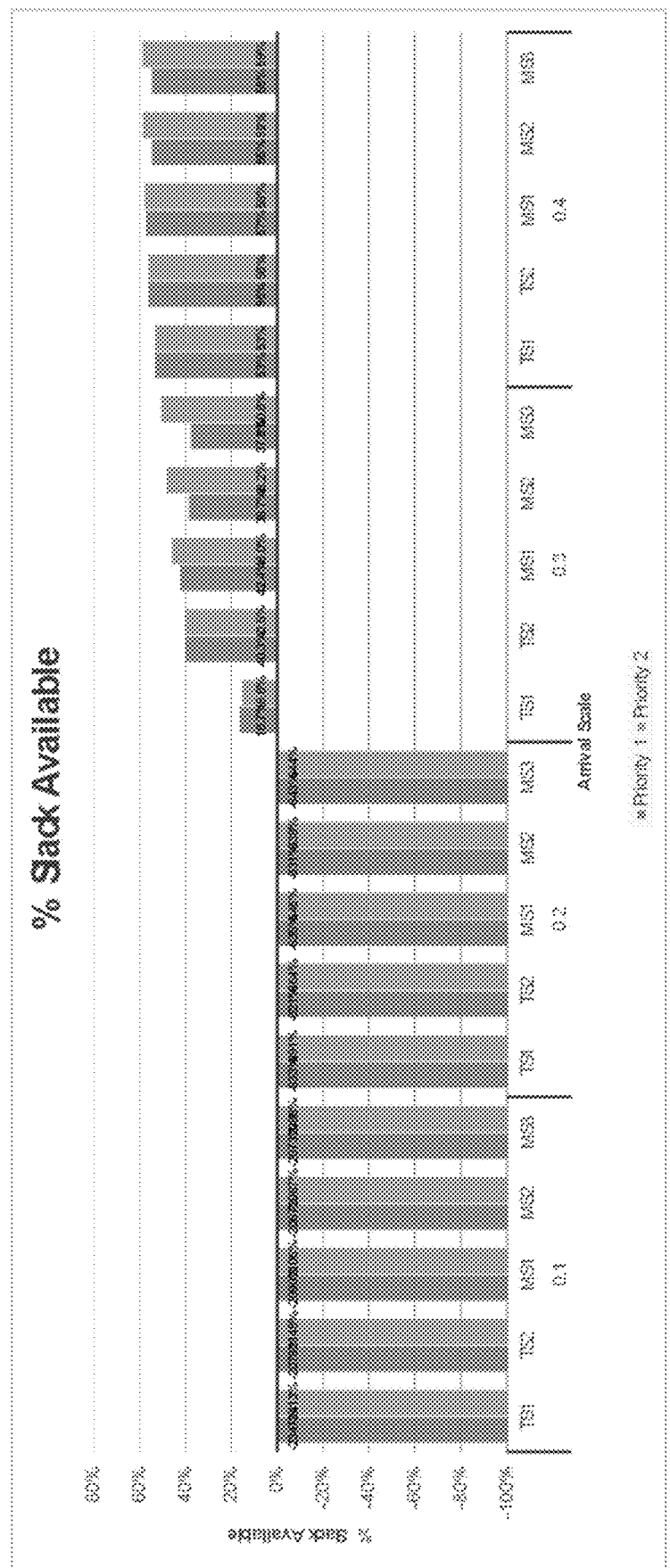
FIG. 8 illustrates a graph of experimental results showing a percentage of available slack, in accordance with some embodiments of the present disclosure.

FIG. 8 illustrates a graph 800 of experimental results showing a percentage of available slack, in accordance with some embodiments of the present disclosure. FIG. 8 is similar to FIG. 7 insofar as the same TS1, TS2, MS1, MS2, and MS3 configurations are used with the same two priorities over a variety of arrival scales. The graph 800 illustrates that aspects of the present disclosure such as TS2, MS1, MS2, and MS3 outperform TS1, and this outperformance is especially evident at arrival scale 0.3. Accordingly, FIG. 8 illustrates that aspects of the present disclosure can improve efficiency in heterogeneous SoCs insofar as increased positive slack correlates with increased efficiency.

Figure 9:
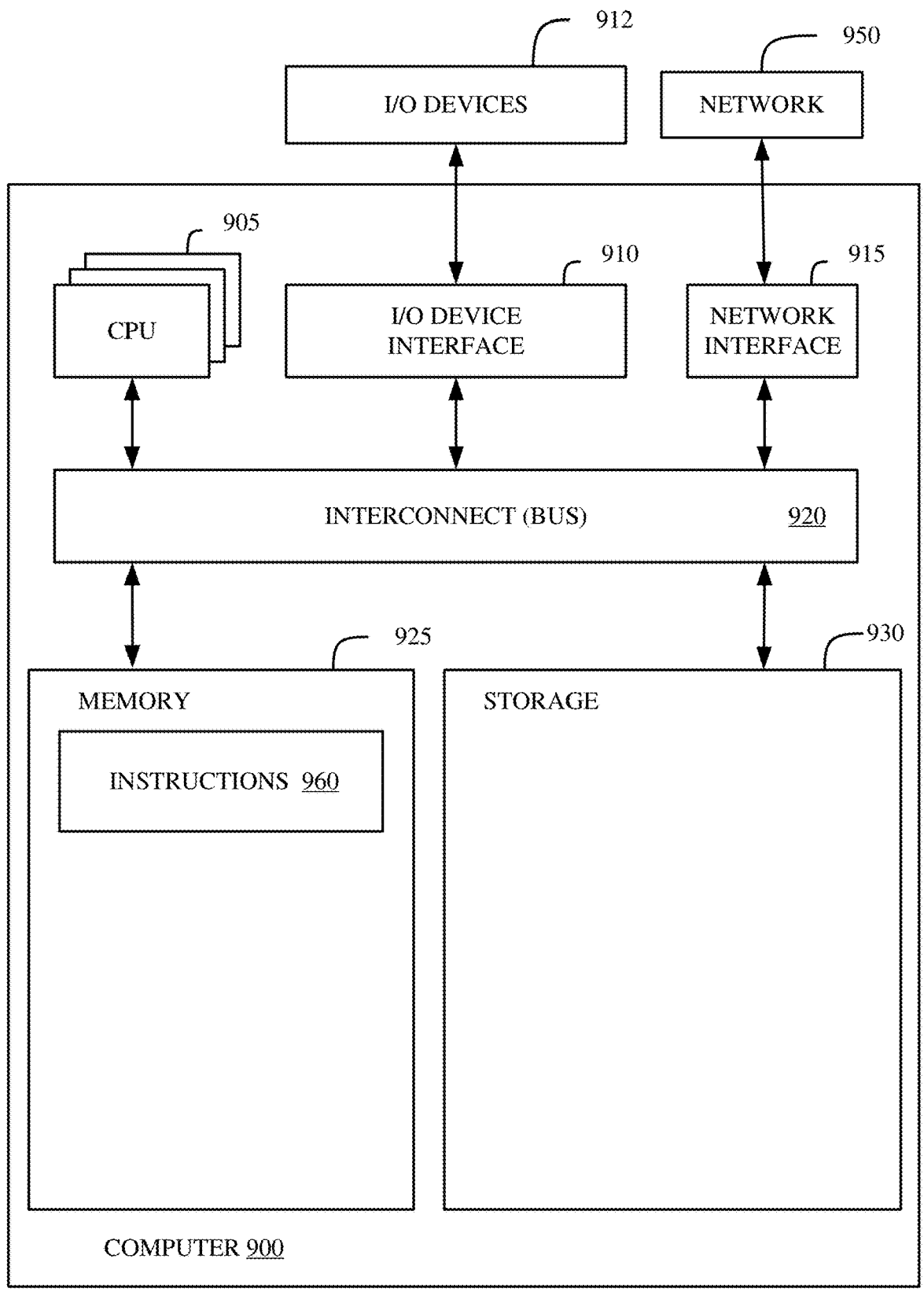
FIG. 9 illustrates a block diagram of an example computer, in accordance with some embodiments of the present disclosure.

FIG. 9 illustrates a block diagram of an example computer 900 in accordance with some embodiments of the present disclosure. In various embodiments, computer 900 can perform any or all of the methods described in FIG. 4-6, implement the functionality discussed in any one of FIGS. 1-3, and/or realize experimental results consistent with FIGS. 7-8. In some embodiments, computer 900 receives instructions related to the aforementioned methods and functionalities by downloading processor-executable instructions from a remote data processing system via network 950. In other embodiments, computer 900 provides instructions for the aforementioned methods and/or functionalities to a client machine such that the client machine executes the method, or a portion of the method, based on the instructions provided by computer 900. In some embodiments, the computer 900 is incorporated into (or functionality similar to computer 900 is virtually provisioned to) the meta pre-processor 104, a heterogeneous SoC 100, or other aspects of the present disclosure.

Computer 900 includes memory 925, storage 930, interconnect 920 (e.g., BUS), one or more CPUs 905 (also referred to as processors herein), I/O device interface 910, I/O devices 912, and network interface 915.

Each CPU 905 retrieves and executes programming instructions stored in memory 925 or storage 930. Interconnect 920 is used to move data, such as programming instructions, between the CPUs 905, I/O device interface 910, storage 930, network interface 915, and memory 925. Interconnect 920 can be implemented using one or more busses. CPUs 905 can be a single CPU, multiple CPUs, or a single CPU having multiple processing cores in various embodiments. In some embodiments, CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random-access memory (e.g., static random-access memory (SRAM), dynamic random access memory (DRAM), or Flash). Storage 930 is generally included to be representative of a non-volatile memory, such as a hard disk drive, solid state device (SSD), removable memory cards, optical storage, or flash memory devices. In an alternative embodiment, storage 930 can be replaced by storage area-network (SAN) devices, the cloud, or other devices connected to computer 900 via I/O device interface 910 or network 950 via network interface 915.

In some embodiments, memory 925 stores instructions 960. However, in various embodiments, instructions 960 are stored partially in memory 925 and partially in storage 930, or they are stored entirely in memory 925 or entirely in storage 930, or they are accessed over network 950 via network interface 915.

Instructions 960 can be computer-readable and computer-executable instructions for performing any portion of, or all of, the methods of FIG. 4-6, implementing the functionality discussed in FIGS. 1-3, and/or realizing experimental results consistent with FIGS. 7-8. In some embodiments, instructions 960 can be referred to as a multi-application, multi-step, heterogeneous SoC scheduling instructions, a multi-application, multi-step, heterogeneous SoC scheduling protocol, and/or a multi-application, multi-step, heterogeneous SoC scheduling mechanism. Although instructions 960 are shown in memory 925, instructions 960 can include program instructions collectively stored across numerous computer-readable storage media and executable by one or more CPUs 905.

In various embodiments, I/O devices 912 include an interface capable of presenting information and receiving input. For example, I/O devices 912 can present information to a user interacting with computer 900 and receive input from the user.

Computer 900 is connected to network 950 via network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
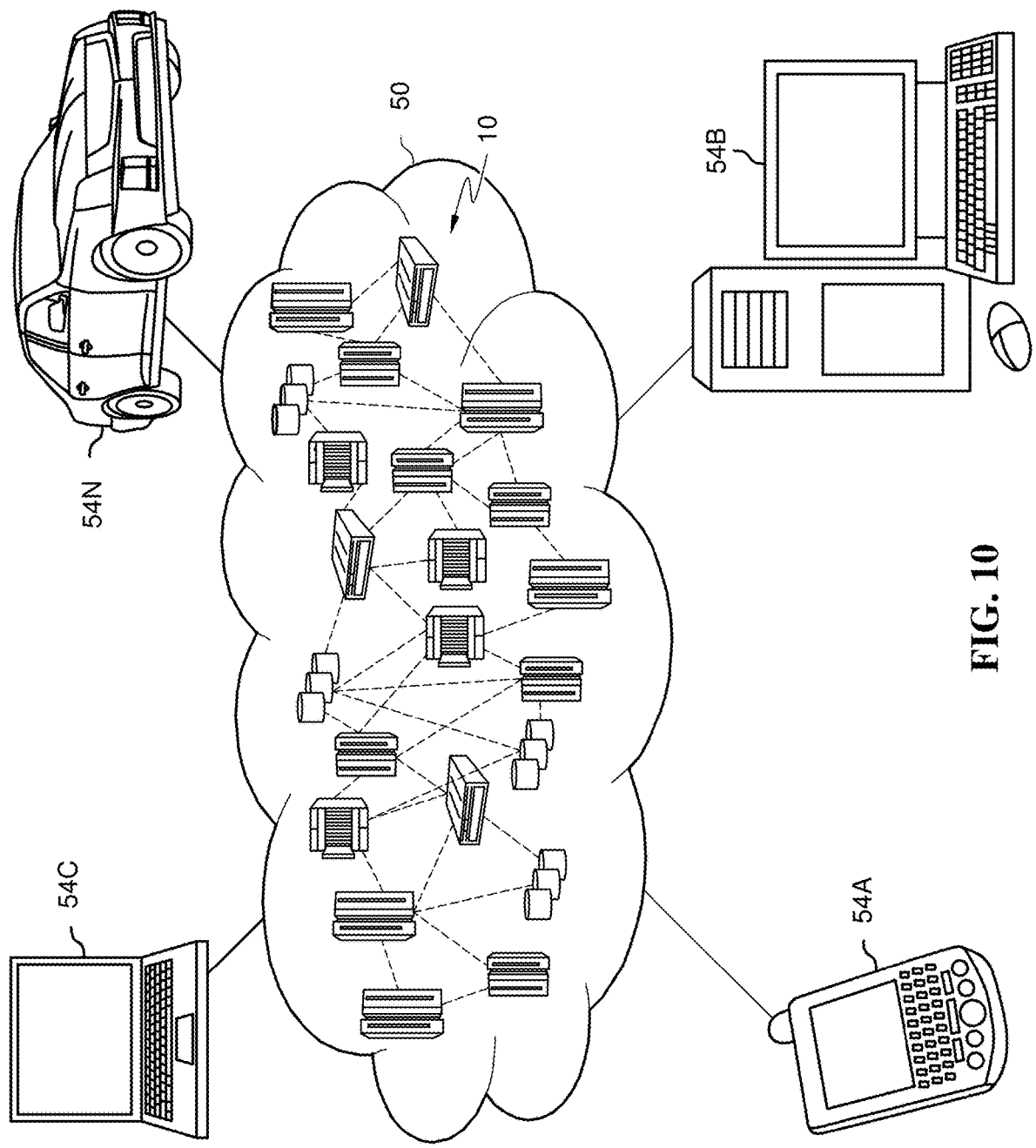
FIG. 10 depicts a cloud computing environment, in accordance with some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
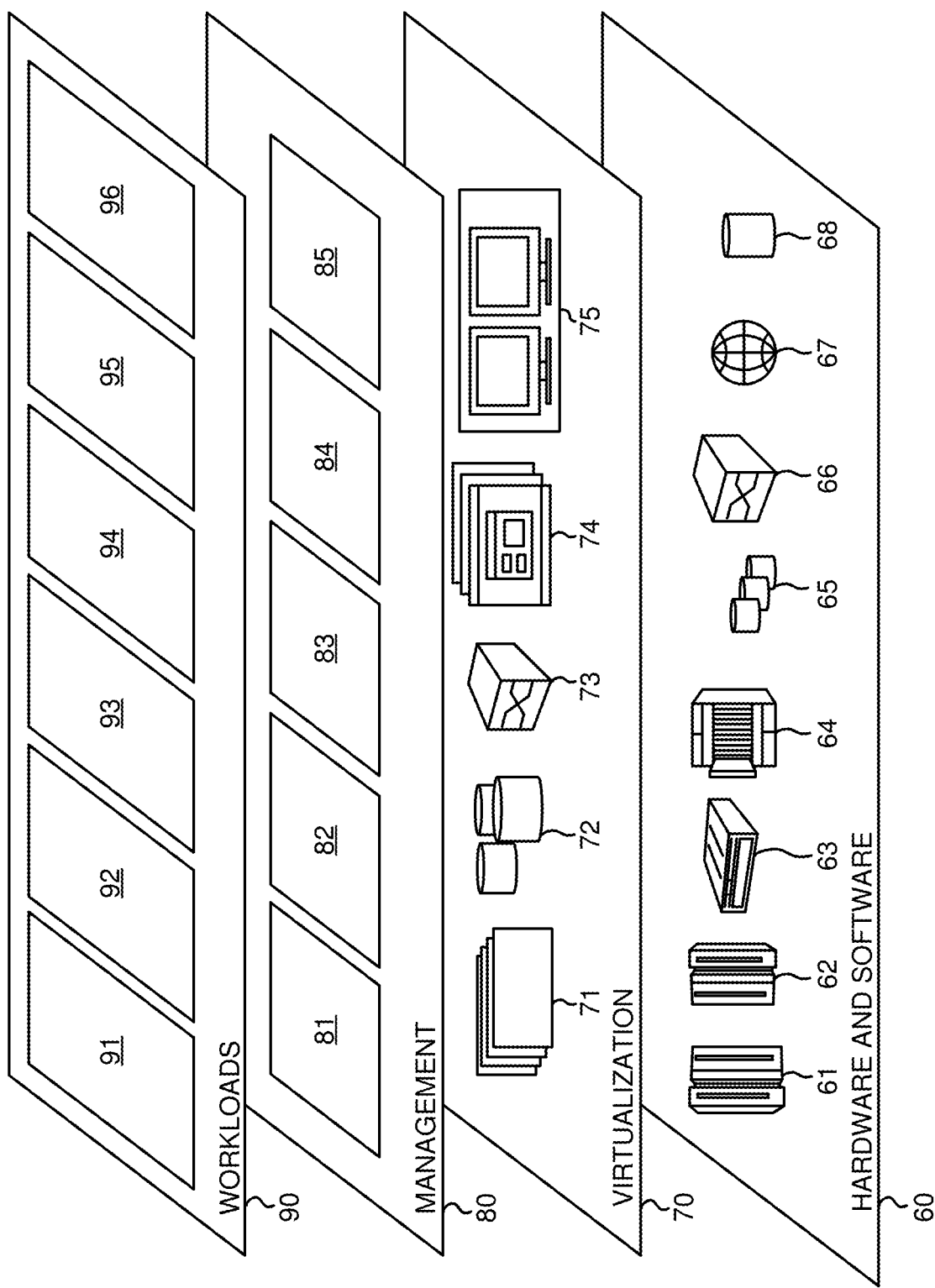
FIG. 11 depicts abstraction model layers, in accordance with some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-application, multi-step, heterogeneous SoC scheduling 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any portion of the method described with respect to FIGS. 4-6, implement any portion of the functionality discussed in FIGS. 1-3, and/or realize experimental results consistent with FIGS. 7-8) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes receiving a directed acyclic graph at a meta preprocessor associated with a heterogeneous system on a chip (SoC) and communicatively coupled to a scheduler, wherein the directed acyclic graph corresponds to a control flow graph of tasks associated with an application executed by the heterogeneous SoC; determining a rank for a respective task in the directed acyclic graph, wherein the rank is based on a priority of the respective task and a slack in the directed acyclic graph; and providing the respective task to the scheduler for execution on the heterogeneous SoC according to the rank.

Example 2 includes the method of example 1, including or excluding optional features. In this example, determining the rank for the respective task further comprises: determining a critical path in the directed acyclic graph; determining a critical path time associated with the critical path; determining a sub-deadline for the respective task; determining the slack by subtracting a computational cost of the respective task from the sub-deadline; and determining the rank by dividing the priority of the task by the slack. Optionally, the critical path comprises a longest execution path through the directed acyclic graph. Optionally, the computational cost is selected from a group consisting of: an average computational cost of the respective task, and a worst-case computational cost of the respective task.

Example 3 includes the method of any one of examples 1 to 2, including or excluding optional features. In this example, the method includes determining there are additional tasks in the directed acyclic graph; determining that respective priorities of the additional tasks are non-critical; determining that an updated slack in the directed acyclic graph is negative; canceling the additional tasks in the directed acyclic graph; and proceeding to a next directed acyclic graph.

Example 4 includes the method of any one of examples 1 to 3, including or excluding optional features. In this example, the method includes receiving heuristics associated with completed tasks from the scheduler; determining an updated critical path in the directed acyclic graph and an updated critical path time; and updating ranks for remaining tasks in the directed acyclic graph. Optionally, the heuristics include information selected from a group consisting of: performance of respective processing elements, traffic in the scheduler, and scheduled tasks and their assigned processing elements.

Example 5 includes the method of any one of examples 1 to 4, including or excluding optional features. In this example, determining the rank for the respective task in the directed acyclic graph further comprises: determining a processing element of the heterogeneous SoC for executing the respective task; and providing an indication of the processing element for executing the respective task to the scheduler. Optionally, the processing element is based on at least one selected from a group consisting of: time constraints associated with the directed acyclic graph and a processing speed of the processing element; and power constraints associated with the directed acyclic graph and a power consumption associated with the processing element.

Example 6 includes the method of any one of examples 1 to 5, including or excluding optional features. In this example, the method is performed by the heterogeneous SoC according to software that is downloaded to the heterogeneous SoC from a remote data processing system. Optionally, the method further comprises: metering a usage of the software; and generating an invoice based on metering the usage.

Example 7 includes the method of any one of examples 1 to 6, including or excluding optional features. In this example, the rank is further based on traffic in the scheduler, dependencies in the directed acyclic graph, and application constraints.

Example 8 includes the method of any one of examples 1 to 7, including or excluding optional features. In this example, providing the respective task to the scheduler for execution on the heterogeneous SoC according to the rank further comprises providing a plurality of tasks to the scheduler for execution on the heterogeneous SoC in an order according to a plurality of ranks associated with the plurality of tasks.

Example 9 is a system. The system includes one or more processors; and one or more computer-readable storage media storing program instructions which, when executed by the one or more processors, are configured to cause the one or more processors to perform a method according to any one of Examples 1 to 8.

Example 10 is a computer program product. The computer program product includes one or more computer readable storage media, and program instructions collectively stored on the one or more computer readable storage media. The program instructions include instructions configured to cause one or more processors to perform a method according to any one of Examples 1 to 8.

What is claimed is:

1. A computer-implemented method comprising:
   receiving a directed acyclic graph at a meta pre-processor associated with a heterogeneous system on a chip (SoC) and communicatively coupled to a scheduler, wherein the directed acyclic graph corresponds to a control flow graph of tasks associated with an application executed by the heterogeneous SoC;
   determining a rank for a respective task in the directed acyclic graph, wherein the rank is based on a priority of the respective task and a slack in the directed acyclic graph;
   providing the respective task to the scheduler for execution on the heterogeneous SoC according to the rank;
   executing, by the heterogenous SoC, the respective task according to the rank;
   determining that respective priorities of additional tasks in the directed acyclic graph are non-critical;
   determining that an updated slack in the directed acyclic graph is negative;
   canceling the additional tasks in the directed acyclic graph; and
   proceeding to a next directed acyclic graph.

2. The method of claim 1, wherein determining the rank for the respective task further comprises:
   determining a critical path in the directed acyclic graph;
   determining a critical path time associated with the critical path;
   determining a sub-deadline for the respective task;
   determining the slack by subtracting a computational cost of the respective task from the sub-deadline; and
   determining the rank by dividing the priority of the task by the slack.

3. The method of claim 2, wherein the critical path comprises a longest execution path through the directed acyclic graph.

4. The method of claim 2, wherein the computational cost is an average computational cost of the respective task.

5. The method of claim 1, further comprising:
   receiving heuristics associated with completed tasks from the scheduler;
   determining an updated critical path in the directed acyclic graph and an updated critical path time; and updating ranks for remaining tasks in the directed acyclic graph.

6. The method of claim 5, wherein the heuristics include information regarding performance of respective processing elements.

7. The method of claim 1, wherein determining the rank for the respective task in the directed acyclic graph further comprises:
determining a processing element of the heterogeneous SoC for executing the respective task; and
providing an indication of the processing element for executing the respective task to the scheduler.

8. The method of claim 7, wherein the processing element is based on
time constraints associated with the directed acyclic graph and a processing speed of the processing element.

9. The computer-implemented method of claim 1, wherein the method is performed by the heterogeneous SoC according to software that is downloaded to the heterogeneous SoC from a remote data processing system, wherein the method further comprises:
metering a usage of the software; and
generating an invoice based on metering the usage.

10. The method of claim 1, wherein the rank is further based on traffic in the scheduler, dependencies in the directed acyclic graph, and application constraints.

11. The method of claim 1, wherein providing the respective task to the scheduler for execution on the heterogeneous SoC according to the rank further comprises providing a plurality of tasks to the scheduler for execution on the heterogeneous SoC in an order according to a plurality of ranks associated with the plurality of tasks.

12. A system comprising:
one or more processors; and
one or more computer-readable storage media storing program instructions which, when executed by the one or more processors, are configured to cause the one or more processors to perform a method comprising:
receiving a directed acyclic graph at a meta pre-processor associated with a heterogeneous system on a chip (SoC) and communicatively coupled to a scheduler, wherein the directed acyclic graph corresponds to a control flow graph of tasks associated with an application executed by the heterogeneous SoC;
determining a rank for a respective task in the directed acyclic graph, wherein the rank is based on a priority of the respective task and a slack in the directed acyclic graph;
providing the respective task to the scheduler for execution on the heterogeneous SoC according to the rank;
executing, by the heterogenous SoC, the respective task according to the rank;
determining that respective priorities of additional tasks in the directed acyclic graph are non-critical;
determining that an updated slack in the directed acyclic graph is negative;
canceling the additional tasks in the directed acyclic graph; and
proceeding to a next directed acyclic graph.

13. The system of claim 12, wherein the program instructions for determining the rank for the respective task include further program instructions configured to cause the one or more processors to perform the method further comprising:
determining a critical path in the directed acyclic graph;
determining a critical path time associated with the critical path;
determining a sub-deadline for the respective task;
determining the slack by subtracting a computational cost of the respective task from the sub-deadline; and
determining the rank by dividing the priority of the task by the slack.

14. The system of claim 12, wherein the program instructions include further program instructions configured to cause the one or more processors to perform the method further comprising:
receiving heuristics associated with completed tasks from the scheduler;
determining an updated critical path in the directed acyclic graph and an updated critical path time; and
updating ranks for remaining tasks in the directed acyclic graph.

15. A computer program product comprising one or more computer readable storage media, and program instructions collectively stored on the one or more computer readable storage media, the program instructions comprising instructions configured to cause one or more processors to perform a method comprising:
receiving a directed acyclic graph at a meta pre-processor associated with a heterogeneous system on a chip (SoC) and communicatively coupled to a scheduler, wherein the directed acyclic graph corresponds to a control flow graph of tasks associated with an application executed by the heterogeneous SoC;
determining a rank for a respective task in the directed acyclic graph, wherein the rank is based on a priority of the respective task and a slack in the directed acyclic graph;
providing the respective task to the scheduler for execution on the heterogeneous SoC according to the rank;
executing, by the heterogenous SoC, the respective task according to the rank;
determining that respective priorities of additional tasks in the directed acyclic graph are non-critical;
determining that an updated slack in the directed acyclic graph is negative;
canceling the additional tasks in the directed acyclic graph; and
proceeding to a next directed acyclic graph.

16. The computer program product of claim 15, wherein the program instructions for determining the rank for the respective task further comprise additional program instructions configured to cause the one or more processors to perform the method further comprising:
determining a critical path in the directed acyclic graph;
determining a critical path time associated with the critical path;
determining a sub-deadline for the respective task;
determining the slack by subtracting a computational cost of the respective task from the sub-deadline; and
determining the rank by dividing the priority of the task by the slack.

17. The method of claim 2, wherein the computational cost is a worst-case computational cost of the respective task.

18. The method of claim 5, wherein the heuristics include information regarding traffic in the scheduler.

19. The method of claim 5, wherein the heuristics include information regarding scheduled tasks and their assigned processing elements.

20. The method of claim 7, wherein the processing element is based on power constraints associated with the directed acyclic graph and a power consumption associated with the processing element.

* * * * *